United States Patent Office 2,865,329
Patented Dec. 23, 1958

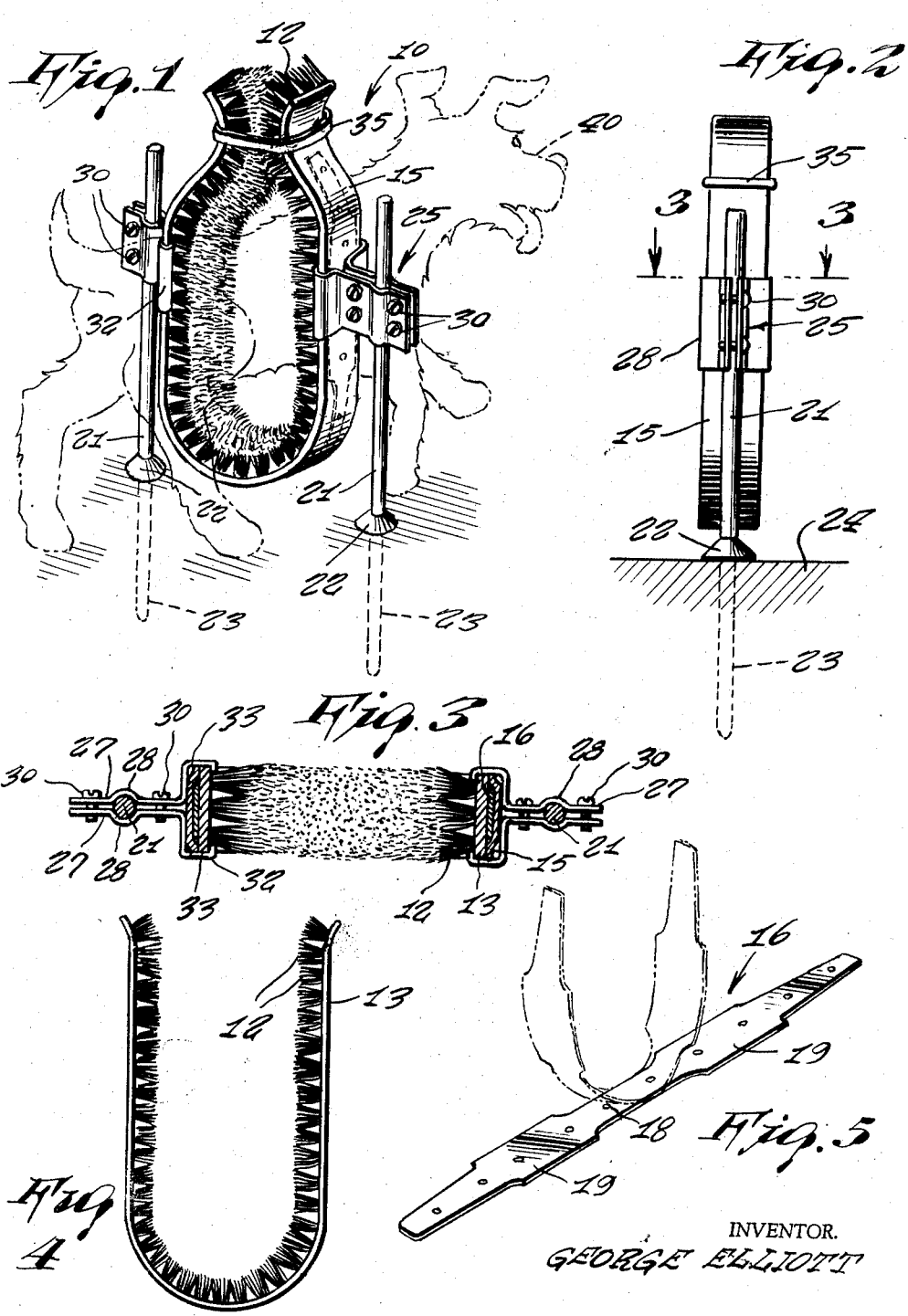

2,865,329
PETS HOME RECREATION
George Elliott, Warroad, Minn.
Application September 25, 1957, Serial No. 686,185
3 Claims. (Cl. 119—83)

This invention relates to apparatus for the care of pets and more particularly to a combination recreation and grooming device therefor.

It is an object of the present invention to provide a combination recreation, exercise, and grooming device for animals which may be substantially entirely operated by the animal so as to perform the stated functions in a simple and efficient manner.

Another object of the present invention is to provide a grooming and recreation device of the above type which the animal can readily learn to manipulate so as to obtain needed exercise simultaneously with providing an entertaining pastime and permitting the animal to perform many of the grooming operations ordinarily requiring a substantial amount of the owner's time.

Other objects of the invention are to provide a combination recreation and grooming device for animals bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of a preferred embodiment of the present invention in operative use;

Figure 2 is an end elevational view of the device shown in Figure 1;

Figure 3 is a horizontal cross sectional view taken along line 3—3 of Figure 2;

Figure 4 is a side elevational view of the brush forming a part of the invention shown alone; and Figure 5 is a perspective view of a stiffening member forming another part of the present invention.

Referring now more in detail to the drawing, a combination recreation, exercise, and grooming device 10 for various types of animals made in accordance with the present invention is shown to include a main brushing element having bristles 12 integrally secured to a base 13, such as molded rubber, plastic, or the like. A fabric, plastic, or other suitable backing 15 is secured to the base 13 of the brush to add sufficient rigidity and body thereto. A stiffening element 16, of a spring metal type of construction, is disposed within the space between the base 13 and backing 15 of the brush so as to yieldably maintain the brush in a predetermined shape. The central portion 18 of the stiffener element 16 is of smaller dimensions than the adjacent portions 19 so as to enable the brush to be formed into the substantially U-shaped configuration shown in Figure 4 which also corresponds substantially to the cross sectional shape of the body of a dog 40 for which the device is to be installed. It will be recognized that other animals, such as goats, deer, etc. may have body shapes of different configurations and sizes. Accordingly, it is only necessary to dispose the narrow portions of the stiffener at different locations in order to permit the brush to be formed to the desired shape.

The brush assembly is mounted upon vertical support rods 21 which have longitudinally adjusted flanges 22 that act as stops or limiting means for controlling the length 23 of the rod that is to be submerged to the ground 24.

A pair of substantially L-shaped clamps 25 are slidably supported upon each one of the rods 21 in engagement with the adjacent side of the U-shaped brush. Each one of these clamps 25 is provided with a base flange 27 having an arcuate recess 28 for receiving the adjacent side of the rod 21. A plurality of bolts 30 are threadingly engaged with the base flanges 27 of each pair of clamps so as to selectively tighten and loosen the engagement of the clamps with the support rod 21 to effect the desired vertical adjustment thereof. The other leg of each clamp 25 is provided with a reentrant portion 32 defining a recess 33 for receiving the adjacent edge of the brush, the bolts 30 also serving to secure the brush between these reentrant portions of the associated pair of clamps 25. An elastic band 35 is used to adjustably secure the upper free ends of the sides of the brush together so as to close the brush to further restrict the opening formed thereby and thus provide additional massaging and exercising action upon the animal.

It will be recognized that this device affords an adjustable currying and brushing machine that may be readily adjusted to the size and height of the animal and which may be readily supported on any desirable type of stand or base secured to the floor or plot of soil that is convenient for the animal. By making the device in a variety of sizes, substantially any type of furry animal can be accommodated. It has also been found that the animal can learn to use this device in a very short period of time so that it grooms itself while it exercises and thus not only provides for the conditioning of the animal, but also improves the appearance and grooming thereof.

While various changes may be made in the detail construction, it shall be understood that such changes shall be within the spirit and scope of the present invention as defined by the appended claims.

What I claim as new and desire to protect by Letters Patent of the United States is:

1. A combination recreation and grooming device for animals comprising, in combination, a brush of generally rigid U-shaped configuration having a pair of sides and an arcuate base, means for supporting said base in substantially vertical plane in adjustable relationship with the ground level, stiffening means in enclosing contact with said sides and base maintaining the shape of said brush against the movement of animals therethrough, and means releasably securing the free ends of said sides together to define a central opening only large enough to permit the pet to pass therethrough in close engagement with the bristles of the brush, said supporting means for said brush comprising a pair of ground engaging stakes in spaced apart side by side parallel relationship, and adjustable clamp means one at each side of said brush engaged with said stiffening means and mounted upon said stakes slidably supporting said brush for longitudinal movement between adjusted vertical positions.

2. The combination according to claim 1, wherein said stiffening means comprises a spring plate substantially coextensive and integral with said brush.

3. The combination according to claim 2, wherein said means for securing said free ends of said sides together comprises an elastic band in adjustable engagement with said free ends of said brush sides.

References Cited in the file of this patent
UNITED STATES PATENTS

| 1,568,226 | Larson | Jan. 5, 1926 |
| 1,582,144 | Pflaum | Apr. 27, 1926 |
| 1,834,175 | Peck | Dec. 1, 1931 |

FOREIGN PATENTS

| 461,582 | Germany | June 23, 1928 |